Feb. 1, 1955 — C. C. CLOUGH — 2,701,023
REMOTE-CONTROL FOR THE ENGINE IN TANK TRUCKS
Filed June 16, 1950 — 2 Sheets-Sheet 2
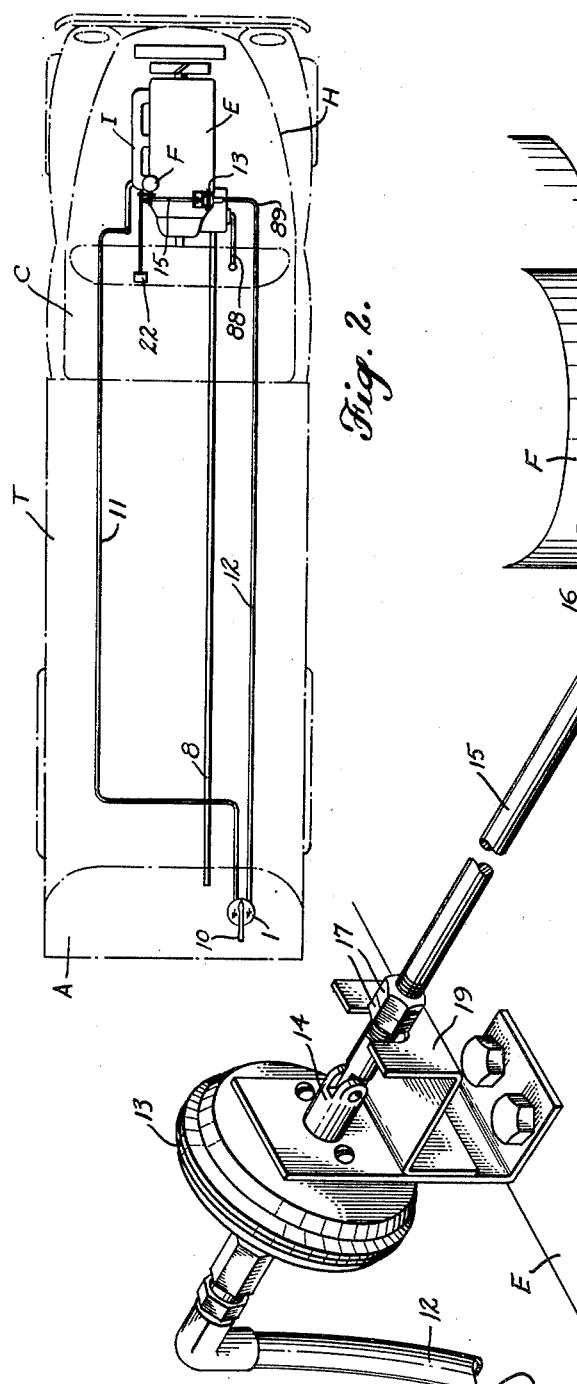
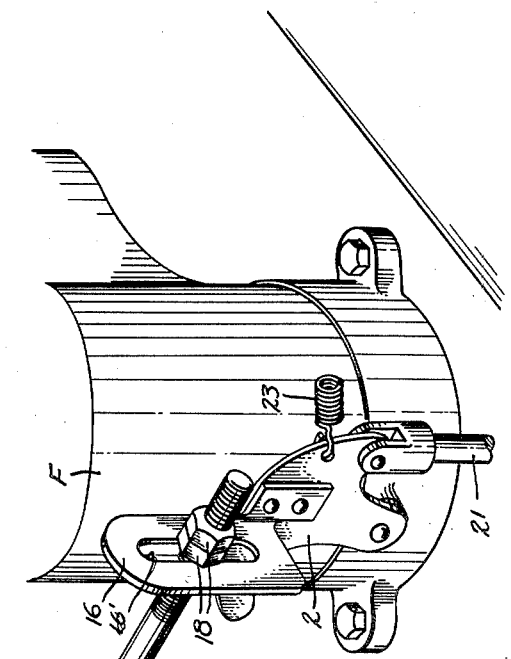
INVENTOR.
CARROLL C. CLOUGH
BY
Reynolds, Beach + Christensen
ATTORNEYS

United States Patent Office 2,701,023
Patented Feb. 1, 1955

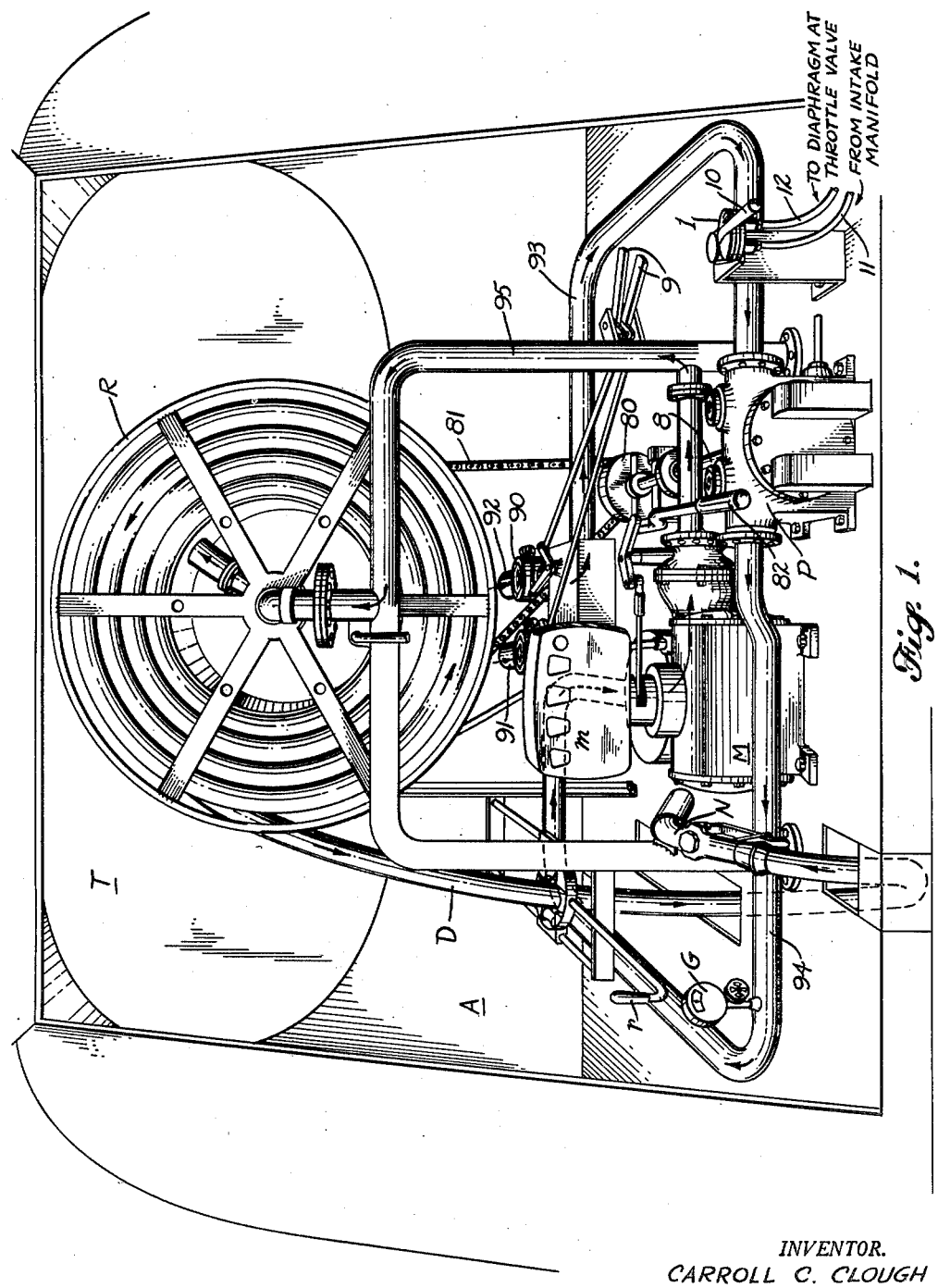

2,701,023

REMOTE CONTROL FOR THE ENGINE IN TANK TRUCKS

Carroll C. Clough, Seattle, Wash.

Application June 16, 1950, Serial No. 168,619

2 Claims. (Cl. 180—53)

Tank trucks such as are employed in the delivery of fuel oil to homes, are usually provided with a delivery pump which is located within a compartment at the rear end, and which is driven by a jack shaft extending rearwardly from the power take-off associated with the truck engine's transmission, at the front end. This pump delivers oil from the tank into the hub of a reel and thence into one end of a reel-mounted hose, all within the rear-end compartment. The hose's nozzle is dragged by hand, ordinarily, to the receiving tank's filler pipe to make the delivery, but upon completion thereof the hose is reeled up by connecting the reel to the jack shaft, which may remain connected to the pump, thus imposing an additional load on the engine.

The pump is rated to deliver at an optimum rate and pressure at a given engine speed, which is usually low, not greatly in excess of the engine's idling speed. Because it is so low, the driver, who is usually the sole attendant, in his desire to make sure that the engine will not stall while making a delivery, and knowing that he will need a little more power later while reeling in, sets the throttle a little wider open than it needs to be, when he prepares to dismount from the cab to initiate a delivery. He knows that he must take gauge and meter readings, open oppropriate cut-off valves, unlock the reel, and drag out the nozzle, all at the rear end of the truck in advance of the delivery, and must also clutch the jack shaft to the reel, lock the reel, turn off valves, and take further meter readings upon completion of the delivery, and has no occasion nor opportunity to interrupt a delivery to climb into the cab and adjust the throttle control. The engine speed, initially set too high before he leaves the cab, continues until he has completed the delivery and has climbed back in the cab to disconnect the drive through the power take-off.

While the pump includes a built-in by-pass which limits the top pressure it can develop, and while the delivery rate is controllable by the valve at the delivery nozzle, or otherwise within the hydraulic system, so that neither development of excessive pressure nor of an unduly high delivery rate are problems, nevertheless excessive engine speed and pump speed do create other problems, the cause whereof is the disinclination of the driver to return to the front end to lower the engine speed as adjustment is seen to be necessary. The results of excessive speed are greater and more rapid wear on the pump, waste of fuel required to run the engine faster and longer than necessary, and the production of excessive vibration and noise. The noise so produced is in itself very objectionable to all within a large radius. Still, if the pump and engine are run at too slow a speed, adequate pressure is not developed, the delivery rate is too low, the time of the driver and equipment is wasted.

It becomes clear from the above why the driver sets his engine speed at a somewhat high value before he initiates a delivery, and makes no effort to change the engine speed during delivery. He cannot make the change from the rear end, and he will not take the trouble to make it from the front end. The resultant waste and excessive wear on all parts, repeated many times daily and day after day, are appreciable and objectionable to the truck owner, and the excessive noise is similarly objectionable to all within hearing.

According to this invention, supplemental throttle control means, coordinated with the normal cab-mounted throttle control, are located at the rear end of the truck, conveniently to the driver while he is in the process of getting ready his hose, so that after he is ready, and not before, he has only to move the supplemental throttle control at the rear end of the truck, and thereby he can regulate the engine speed as conditions require. If the supplemental throttle control is preset, he can by this rear end supplemental control speed up the engine from bare idling speed to the precise speed that will deliver at the required rate and pressure without appreciable overspeed. Thus, the throttle setting will always be correctly made according to the conditions obtaining at any given time, and there is no requirement for any guessing at the setting of the principal throttle control means in the cab, and in the event there is no settable principal throttle control means, as there is not in some trucks, all the setting during delivery is accomplished from the rear end, and alway the delivery will be made at the rate that is intended and which is best suited for the purpose.

The hose reel's drive is connectible to the same jack shaft that drives the pump. If the pump remains connected at all times, and only the reel is clutched to and declutched from the jack shaft at appropriate times, the additional load of the reel makes desirable a somewhat higher engine speed. This is one of the reasons why the driver sets his cab-mounted throttle control for too high an engine speed, but by the provision of a supplemental throttle control device at the rear end of the truck, the engine speed may even be increased when required. Thereby adequate engine speed can be assured under all conditions.

The provision of mechanism to the ends indicated above, and capable of connection to the appropriate elements of standard trucks, is the primary object of this invention. Complementally it is also an object to provide such secondary throttle control means which will operate independently of the principal throttle control means, and which because of the inclusion of lost-motion means between the secondary and the principal throttle control means will not interfere with the normal operation of the latter, and which can be preset to a correct value.

Likewise it is an object to provide such a supplemental throttle control device which is supplied with power for actuation at a distance in a convenient manner, and preferably in a manner which avoids any electrical mechanism in the vicinity of the hose nozzle, where it might cause a fire or explosion hazard, yet which is readily available on such a truck, the particular means herein shown being a vacuum device.

With such ends in view the present invention comprises the novel tank truck assembly, and in particular the supplemental throttle control mechanism for incorporation therein, in the manner and of the kind shown by way of example in the accompanying drawings, wherein the invention is shown in a typical arrangement, and such as will be more fully explained in this specification and defined by the claims.

Figure 1 is a perspective view of the rear end compartment of such a tank truck with its cover or door upraised, as the mechanism therein would be viewed by the driver.

Figure 2 is a plan view of such a tank truck, with most of the mechanism thereof eliminated to emphasize the supplemental throttle control device.

Figure 3 is an isometric view of the truck engine's carburetor, showing a typical manner of connection of the supplemental throttle control device to it.

As is well known, such a tank truck comprises the tank, or group of tanks, generally indicated at T (see Figure 2), immediately behind the cab C, and the engine E within the hood H, at the forward portion of the truck. At the rear end of the truck is a closed compartment A, within which are located a hose reel R (see Figure 1), carrying hose D, a pump P, a meter M with its register m, and various piping, controls, the gauges, such as the pressure gauge G.

The oil, gasoline or other liquid which is being transported in the tank T is delivered therefrom by way of the pipe connections at 91 or 92, past valves such as that at 90, under controls at 9, and the liquid, after passing the valves at 90, enters a suction line 93 to the low pressure side of the pump P, and from the pump goes by way of a pressure line 94 to the meter M and its counter m, leaving the meter by way of the pipe 95 for delivery at the intake end of the delivery hose D upon the reel R by way of the reel's hub, and then it goes to a valved nozzle N at the free end of the hose. A pressure gauge G indicates the pressure developed by the pump P.

The pump is directly driven by the jack shaft 8 extending rearwardly from the power take-off 89, controllable at 88 from within the cab C for connection to and disconnection from the engine. The hose reel is driven for reeling in, in such installations, from the same power take-off by means of a clutch 80 and drive chain 81, under control of the clutch-control lever 82. The rate of delivery of the pump being driven from the power take-off 8, which in turn is connected to the engine E, is seen to be dependent upon the speed of the engine E.

All the above is more or less standard, and in itself is not part of this invention. The present invention is concerned with the provision of means cooperating with such a standard installation for setting the speed of the engine at an optimum rate, at the proper time and doing so from the rear end of the truck.

As will be recognized, it would be extremely undesirable to employ in the vicinity of the valved delivery nozzle N electrically actuated mechanism which might, through an inadvertent spark, cause a fire or explosion. For that reason it is preferred to employ some other means of control at a distance, and conveniently the vacuum developed in the intake manifold I of the engine E is employed for this purpose. A suction line 11 extends from a connection to the intake manifold I to the rear end of the truck, where it connects with an on-off valve 1, operable by a handle 10. A second line or tube 12 extends from the valve 1 to an actuator in the vicinity of the carburetor F of the engine E. This actuator may take the form of a simple suction-actuated diaphragm device, indicated at 13, of any suitable and known construction, which upon application of suction will cause longitudinal movement of a stem 14. This stem is connected by way of a lost-motion connection including a rod 15 having lock nuts 18 and passing through a slot 16' in a bracket 16 mounted upon or formed as part of the actuating lever 2 of the carburetor F, in such manner that a pull on the rod 15 in opposition to the usual throttle-closing spring 23 will move the lever 2 toward throttle-open position. The arrangement may enable adjustment without any predetermined set value, but preferably the movement is to a definite position, wherein the parts are halted by the adjustable set nuts 17 as they engage the bracket 19. When so moved the throttle is set for the optimum engine and pump speed, and if this is found not exactly right the interconnection can be adjusted to just the right degree, at the nuts 17, or at the nuts 18 at the opposite end of rod 15. The nuts 18 are at one side only of the lever 2 and its bracket 16, hence the principal throttle control mechanism 22 in the cab and the connected rod 21 extending thence to the lever 2 can effect rocking of that lever in the usual way, without effect on the supplemental throttle control, because of the lost-motion connection thus provided. Conversely, throttle-opening rocking of lever 2 by a pull to the left, in Figure 3, on rod 15 may cause movement of the principal throttle controls 21, 22, but this is immaterial.

Now when the driver arrives to make a delivery, he need not set his normal throttle control device within the cab, but merely leaves his engine idling, connects the power take-off by means of the control at 88 within the cab, goes to the rear of his tank truck and opens the compartment A, notes his initial meter reading and then, when everything is in readiness, he moves the handle 10 to its throttle-open limit position, and thus controls the valve 1 to reset correspondingly the engine E through its throttle control lever 2. Having reset the engine to the correct speed, he carries his nozzle N to the fill pipe, commences and completes the delivery, controlling it by the valve at the nozzle. When he is through, he carries the nozzle back to the rear end compartment, and connects the clutch at 80 to the reel R. The reel now reels in the hose, and its laying upon the reel is governed by the handle r. The valve 1 and actuator 13 may be of a type to permit slowing down of the engine, if in reeling in this is desirable towards the end of the operation, but usually they are not of that type, and control of the reeling in by the clutch handle 82 is sufficient. When the reeling in operation is completed he moves the control handle 10 to throttle-closed position, locks the reel, stows the nozzle N, and now can take his final meter reading without haste, for the engine is idling, and then he closes the compartment, delivers his invoice, and upon returning to the cab and disconnecting the power take-off by means of the control 88, is ready to drive off. All the controls, while he was occupied at the rear of the truck, were accomplished from that rear end, as soon as needed but not long in advance of need, were capable of accomplishment during operation of the mechanism at that end, and were properly preset at all times. The final details, after completion of reeling in, require some little time, during all of which, heretofore, the engine and pump continued to operate at a higher speed than necessary, yet it seemed to the driver a waste of time, and a bother, to go to his cab and slow down the engine and disconnect his power take-off before completing his work at the rear end, hence he did not do so. Now he can shut down the engine as soon as it is no longer needed, without leaving the rear end, hence is quite sure to do so. The merit of this invention lies, however, not in the increased convenience to the driver, but in the provision of means to lessen wear and waste, of such nature and so located that it is easier to use them than not, which in turn insures that they will be used as and when they should be, and that the wear and waste will be practically eliminated.

I claim as my invention:

1. In a tank truck or the like, in combination with the truck's engine, including its carburetor and the throttle lever thereof, all mounted at the forward part of the truck; a driven device such as a delivery pump, located at the rear of the truck; a drive shaft extending from the truck's engine to said driven device to drive the latter; a principal throttle control means located in the forward portion of the truck and operatively connected to the throttle lever; a suction-operated actuator mounted adjacent the throttle lever, and biased to remain in a given position of rest; a pull-rod or the like extending from said actuator past said throttle lever; a lost-motion connection between said pull-rod and the throttle lever including a first abutment on said pull-rod at its end distant from the actuator, and positioned to engage and shift the throttle lever, independently of actuation of said principal throttle control means, towards throttle-open position upon movement of the actuator from its position of rest; a bracket fixed relative to the carburetor, a second abutment carried by the pull-rod near but beyond said bracket from the actuator, constituting, with the bracket, a stop means to limit movement of the pull-rod in the throttle-opening sense, said second abutment being adjustable along the pull-rod to selected positions corresponding to selected throttle openings; a manually actuated control device located at the rear rend of the truck; and a suction line extending from the intake manifold to said control device and from said control device to said actuator, to energize the latter for throttle-opening movement, as limited by said stop means.

2. Control mechanism for a truck engine which is mounted at the forward end of the chassis, at the rear end whereof is mounted certain driven devices such as a delivery pump having an interruptible driving connection to the engine, which truck engine includes the normal carburetor and throttle lever both mounted at the forward end of the chassis, and the normal throttle lever controls, said control mechanism including: a suction-operated actuator mounted adjacent the throttle lever, and biased to remain in a given position of rest, means operatively connected to said actuator and adapted to be connected with the throttle lever, to move the latter towards open position by energization of said actuator and consequent movement from its position of rest, said connecting means including lost-motion mechanism which when said means is operatively connected to the actuator permits normal opening movement of the throttle lever with its normal controls without movement of said actuator from its position of rest, a control device located at the rear end of the chassis, an operative connection from said control device connected to a source of suction at the engine at the front end of the chassis, a further operative connection between said control device and said actuator, for transmitting suction to energize the latter, and two complemental stop means, one fixed relative to the carburetor and the other movable with the operative connection between the actuator and the throttle lever, in position for interengagement to limit the extent of the throttle lever's opening movement by said actuator.

References Cited in the file of this patent

UNITED STATES PATENTS

| | | |
|---|---|---|
| 1,942,181 | Maurer et al. | Jan. 2, 1934 |
| 2,055,539 | Jacoby et al. | Sept. 29, 1936 |
| 2,126,863 | Barton | Aug. 16, 1938 |
| 2,252,871 | Sohl | Aug. 19, 1941 |
| 2,315,085 | Churchward | Mar. 30, 1943 |
| 2,361,305 | Marmor | Oct. 24, 1944 |
| 2,563,914 | Biszantz | Aug. 14, 1951 |
| 2,588,136 | Mallory | Mar. 4, 1952 |